(No Model.)
D. G. HASKINS.
Propelling Vessels.
No. 241,802.                    Patented May 24, 1881.
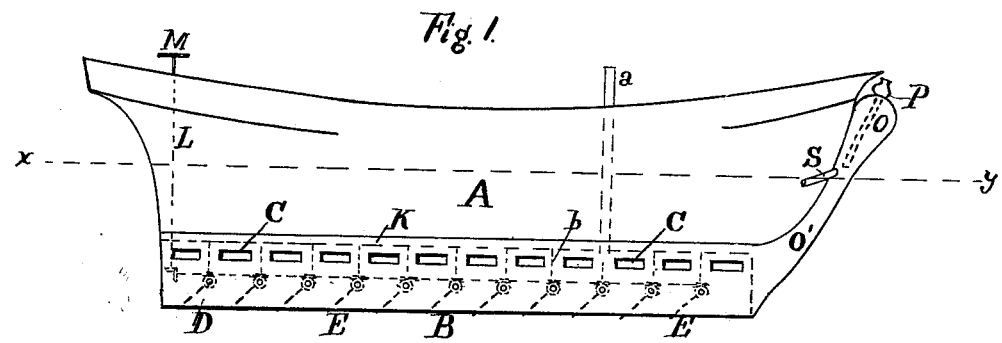
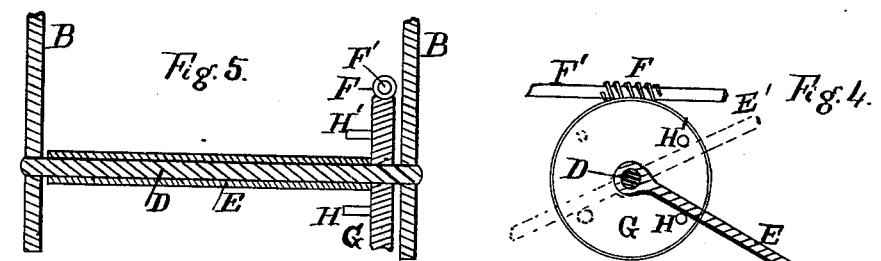
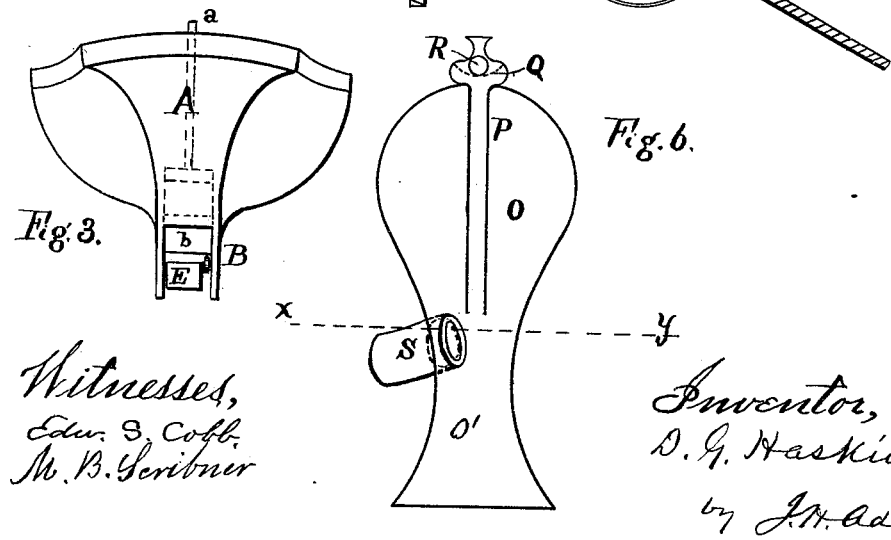
Witnesses,
Edw. S. Cobb.
M. B. Scribner.
Inventor,
D. G. Haskins
by J. H. Adams
Atty

UNITED STATES PATENT OFFICE.

DAVID G. HASKINS, OF CAMBRIDGE, MASSACHUSETTS.

PROPELLING VESSELS.

SPECIFICATION forming part of Letters Patent No. 241,802, dated May 24, 1881.

Application filed August 12, 1880. (No model.)

*To all whom it may concern:*

Be it known that I, DAVID GREENE HASKINS, of Cambridge, in the county of Middlesex and State of Massachusetts, have invented a new and useful Improved Method and Means of Propelling Vessels, of which the following is a specification.

My invention relates to a means of automatically propelling a vessel in the water by the motion of the waves or the upward and downward movement of the water upon which the vessel floats.

The invention consists in constructing a vessel with a hollow or double keel open at the bottom and extending longitudinally either continuously or in sections from stem to stern, its shape being similar to that of an inverted trough. The ends of the hollow keel may be either open or closed, as circumstances may require. At or near the upper part of the hollow keel, on either side, are openings for the free ingress and egress of water. The sides or walls of the double keel may extend upward into the hull of the vessel above the water line, and in such case pipes for the ingress and egress of air may extend from the upper part of the space inclosed by the walls of the double keel, upward through the vessel, in order to secure the free flow of water in the said space. Within the space formed by the double keel is arranged a series of floats or blades hinged or pivoted to shafts extending across the double keel. The said blades are designed to swing in the arc of a circle limited to an angle of twenty-five degrees above and twenty-five degrees below, more or less, the line of the shafts to which they are attached, so that as the vessel rises and falls by the motion of the waves the water will act alternately upon the upper and lower surfaces of the blades with such force as to propel the vessel forward. Provision is made for arresting and reversing the motion of the vessel by shifting the position of the blades.

My invention further consists in a means for preventing the running under of the vessel, and also for aiding in the propulsion of the vessel, as hereinafter set forth.

Referring to the drawings, Figure 1 is an elevation of the hull of a vessel embodying my invention. Fig. 2 is a bottom view of the keel and inclosed blades. Fig. 3 is a transverse section of Fig. 1. Fig. 4 represents the device for reversing the blades enlarged. Fig. 5 is a transverse section, enlarged, of a portion of the sides of the hollow keel, showing one of the shafts to which the blades are attached and the reversing mechanism. Fig. 6 is a section of the device for preventing the running under of the bow of the vessel.

A represents the hull of a vessel, which, instead of having a central keel, is constructed with a central recess extending from stem to stern of the vessel and open at the bottom, thus forming a double or hollow keel, as shown in Fig. 3. At each side of the recess are apertures C, to admit of the free ingress and egress of the water. Above the recess may be arranged an air-tight chamber, K, if found necessary, for the greater buoyancy of the vessel. The recess formed by the double keel may extend upward to or above the water line at the center or on each side of the vessel, and in such case pipes $a$ should extend from the upper part of the recess through the vessel for the entrance and escape of air, so as to insure a free flow of water in the recess. Between the blades are vertical partitions $b$, extending upward partially or to the top of the recess.

Within the recess at the bottom of the vessel is a series of floats or blades, E, hinged or attached to cross bars or shafts D, so as to admit of their partial rotation, the amount of rotation being limited by means of pins or stops H H' on disks G, attached to the shafts D, as shown in Fig. 4. Instead of a hinged float, a sheet of steel or elastic metal may be secured to the shafts D. The movement of the blades is limited to an angle of twenty-five degrees, more or less, above, to twenty-five degrees, more or less, below, a plane horizontal to the axis of the floats.

The periphery of the wheel or disk G is constructed with a worm-gear, which engages with worms F, formed on a shaft, F', which extends the entire length of the keel. The said shaft is operated by means of a bar or rod, L, having a miter-gear on its lower end engaging with a similar gear on the shaft F'.

The operation of the blades E is as follows: If the vessel maintains a level position as it rises and falls, all the blades will act together, either as ascending or descending inclined planes, to move the vessel forward. If the bow rises and the stern descends, the blades toward the bow will act as descending inclined planes, and those toward the stern as ascending inclined planes; but the tendency of all will still be to propel the vessel forward, inasmuch as the pressure of the water upon the blades, whether from above or below, will react upon them in a direction toward their axes.

The hinged or swinging blades may be applied to an air-vessel or balloon to propel it in a lateral direction as it rises or descends in the air.

When the motion of the vessel is to be arrested or reversed the shaft F' is turned, which operates the wheel G, causing the blades E to incline upward, in which position they will have no motive power, or to entirely reverse their direction with respect to their axes, which will consequently reverse the direction of their propelling-power.

Fig. 6 represents a device designed to be attached to the bow of the vessel to prevent it from running under, and also to aid in propelling the vessel. The device is to be placed upon the bow of the vessel, so as to be partially submerged below the water-line, as shown, said water-line being indicated by the line $x\,y$. The device, to which I have given the name of "wave-ram," consists of a hollow shell or vessel, O O', made of sheet metal or other suitable material. The bottom is made open and of a tunnel or flaring shape, and the upper portion, O, is an air-chamber, in which is a pipe, P, open at the bottom and extending downward to a point a little above the water-line and upward through the top of the air-chamber, where it has an enlargement, in which is a ball-valve, R, which is designed to close the upper opening of the pipe P when forced up by air or water in the wave-ram. A wire-netting, Q, is arranged to hold the ball-valve R when the pipe is open. At the rear of the lower portion of the wave-ram is a pipe, S, provided with a valve opening outward and placed at or just below the water-line, through which the water is forced, and which, by its reaction, serves to force the vessel forward. Instead of placing the pipe in the lower part, O', of the device, a similar outlet-pipe and valve may be arranged in the upper portion, O, in which case air will be forced out, which, by its reaction, will produce the same result as in the lower portion. The wave-ram is designed to be placed in front of the vessel's bow, and is to be of a shape to conform, as near as may be, to the contour of the same.

The operation of the wave-ram is as follows: Being attached to the vessel's bow so as to be partially submerged below the water-line $x\,y$, as shown, the downward movement of the vessel will cause the water to be forced upward, thus compressing the air in chamber O and causing the ball-valve R to close the upper opening of pipe P. At the same time the water will be forced out through the pipe S with such force as to aid in the forward movement of the vessel. As the vessel again rises with the motion of the waves the valve R will fall upon the wire-netting Q and allow the air to enter pipe P and supply the chamber O as required.

There may be two outlet-pipes S, one on each side of the bow, from one and the same wave-ram, or two contiguous wave-rams may be employed, each having a single outlet, so that there will be two currents of water forced through the pipes S.

Wave-rams may also be similarly attached to the stern of the vessel. Thus the wave-ram may be made to serve the double purpose of maintaining the buoyancy of the vessel's bow and aiding in the propulsion of the vessel.

I do not confine my wave-ram to any particular size or shape, as these may be changed to adapt it to particular uses and attachments, the principal features of the device being an air-space, a water-space with its exit-pipe and valve, and a central pipe provided with a valve and opening at the top. In some cases it may be desirable to reverse the direction in which the valves open.

What I claim as my invention, and desire to secure by Letters Patent, is—

1. The combination of the swinging blades or floats E, the worm-gear disk G, provided with the pins or stops H, and the worm-shaft F F', substantially as and for the purpose set forth.

2. A wave-ram, O O', composed of a hollow shell or vessel and inclosing an air-chamber and water-space, and provided with an outlet-pipe, S, with a valve, and an air-pipe, P, provided with a valve, substantially as and for the purpose specified.

3. A series of swinging blades, E, attached to separate and independent shafts, and arranged within a recess in the bottom of a vessel, the said blades being limited in their motion on their axes, and acted upon by the water, as the vessel rises and falls, to automatically propel the vessel, as set forth.

4. The partitions $b$, in combination with the swinging blades E in a recessed keel, B, as and for the purpose specified.

In testimony whereof I have signed my name to this specification in the presence of two subscribing witnesses.

DAVID GREENE HASKINS.

Witnesses:
J. H. ADAMS,
EDW. S. COBB.